US009467753B2

(12) United States Patent
Atherton

(10) Patent No.: US 9,467,753 B2
(45) Date of Patent: Oct. 11, 2016

(54) METHOD AND SYSTEM FOR VEHICLE MONITORING

(71) Applicant: Assetworks Inc., Wayne, PA (US)

(72) Inventor: Lee Michael Atherton, San Diego, CA (US)

(73) Assignee: Assetworks LLC, Wayne, PA (US)

( * ) Notice: Subject to any disclaimer, the term of this patent is extended or adjusted under 35 U.S.C. 154(b) by 25 days.

(21) Appl. No.: 14/567,372

(22) Filed: Dec. 11, 2014

(65) Prior Publication Data
US 2015/0161425 A1    Jun. 11, 2015

Related U.S. Application Data

(60) Provisional application No. 61/914,530, filed on Dec. 11, 2013.

(51) Int. Cl.
G06K 7/10 (2006.01)
H04Q 9/00 (2006.01)
G07C 5/00 (2006.01)
G06K 17/00 (2006.01)

(52) U.S. Cl.
CPC *H04Q 9/00* (2013.01); *G07C 5/00* (2013.01); *G06K 2017/0045* (2013.01); *H04Q 2209/47* (2013.01); *H04Q 2209/883* (2013.01)

(58) Field of Classification Search
CPC ............... H04Q 9/00; H04Q 2209/47; H04Q 2209/883; G07C 5/00; G06K 17/0045
See application file for complete search history.

(56) References Cited

U.S. PATENT DOCUMENTS

2006/0208890 A1* 9/2006 Ehrman ................. G06Q 10/08
340/572.1
2014/0372498 A1* 12/2014 Mian ....................... H04L 67/12
709/201

* cited by examiner

Primary Examiner — Leon Flores
(74) Attorney, Agent, or Firm — Maldjian Law Group LLC

(57) ABSTRACT

There is a system for radio frequency identification (RFID) tag-based vehicle monitoring comprising a vehicle or other movable asset, having a plurality of sensors, each sensor operably connected to one of a plurality of after-market installed RFID tags, the plurality of after-market installed RFID tags configured to receive sensor information from the plurality of sensors and to transmit, via RFID communications, the sensor information to a gateway.

8 Claims, 3 Drawing Sheets

METHOD AND SYSTEM FOR VEHICLE MONITORING

CROSS-REFERENCE TO RELATED APPLICATIONS

This application claims the benefit of U.S. Provisional Application Ser. No. 61/914,530 filed Dec. 11, 2013, entitled "METHOD AND SYSTEM FOR SITE-BASED POWER MANAGEMENT OF RADIO FREQUENCY IDENTIFICATION IMPLEMENTATIONS," which is incorporated herein by reference in its entirety.

BACKGROUND

1. Field

The present invention relates generally to systems and methods for vehicle monitoring. More particularly, the present invention relates to vehicle monitoring that is easy to implement and retrofit onto a vehicle.

2. Description of Related Art

Vehicle monitoring is well known, using sophisticated systems that come installed in vehicles, all connected to an on-board computer and being invisible to riders or users of the vehicle as the connections are all in the floors, doors and otherwise concealed.

While newer vehicles often have these monitoring systems, older vehicles often do not, less expensive vehicles may not, and vehicle manufacturers may not have the technology to incorporate such monitoring systems.

At the same time, owners of vehicles not having such monitoring systems may still want to monitor various operational characteristics of their vehicles—without having to perform expensive retrofitting (such as tearing up seats, upholstery, walls, doors, etc).

There thus remains a need for systems to monitor vehicle characteristics that can be installed easily in a multitude of vehicles according to vehicle characteristics and vehicle owner/operator desires.

SUMMARY

There is a system for radio frequency identification (RFID) tag-based vehicle monitoring comprising a vehicle comprising a plurality of sensors, each sensor operably connected to one of a plurality of after-market installed RFID tags, the plurality of after-market installed RFID tags configured to receive sensor information from the plurality of sensors and to transmit, via RFID communications, the sensor information to a gateway, and a gateway configured to receive, via RFID communications, sensor information.

The plurality of sensors comprise at least a first vehicle manufacturer sensor and a first after-market sensor. The gateway may be located on the vehicle.

The system may further comprise a mobile data terminal, operably connected to the gateway and configured to receive the sensor information from the tag, and further configured to communicate sensor information to a central management system and a central management system configured to receive sensor information from the gateway and process the sensor information.

The gateway may be located at an entrance to a site.

The plurality of after-market installed RFID tags may be configured to determine if the vehicle is in motion and if it is then listen for the gateway and upon hearing the gateway communicate, via RFID communications, the sensor information to the gateway.

The plurality of after-market installed RFID tags may comprise a first RFID tag and one or more further RFID tags and the first RFID tag may be configured to determine if the vehicle is in motion and if it is then listen for the gateway and upon hearing the gateway awaken the further RFID tags, communicate, via RFID communications, its sensor information to the gateway, and the further RFID tags are configured to be awoken by the first RFID tag, and communicate, via RFID communications, their sensor information to the gateway.

BRIEF DESCRIPTION OF THE DRAWINGS

Embodiments will now be described, by way of example only, with reference to the attached Figures, wherein.

DETAILED DESCRIPTION

Figure 1:
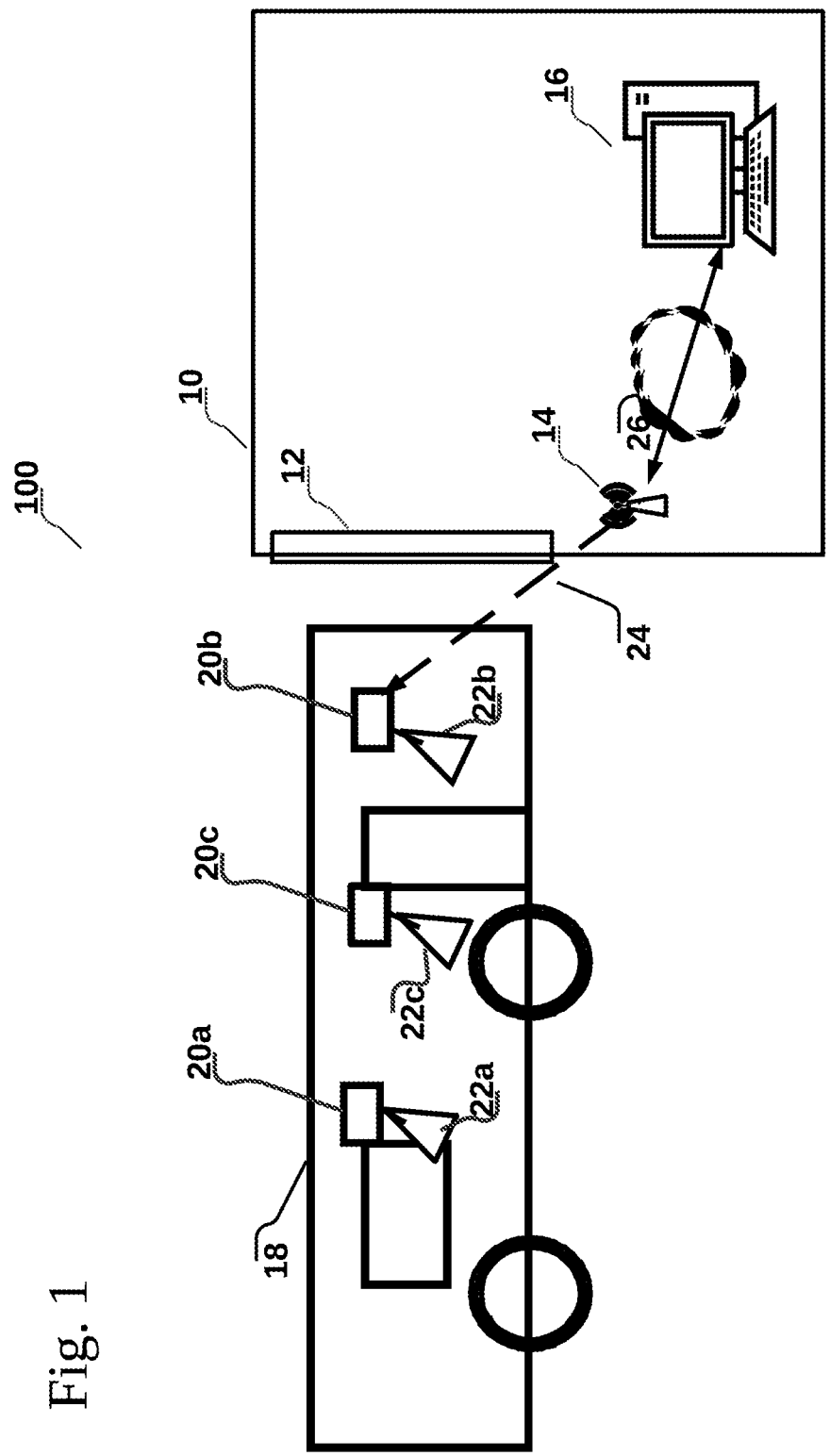
FIG. 1 shows a high-level architecture of a system for RFID based vehicle monitoring systems according to an embodiment of the invention.

FIG. 1 shows a high-level architecture of system 100 for a tag based asset management system in accordance with an embodiment of the invention, comprising site 10 further comprising site entrance 12, gateway 14 and central management system 16, asset 18 further comprising asset tag 20a/b/c, sensor 22a/b/c, and communication network 26.

Site 10 may be a location at which users of system 100 would like to track assets 18 (such as the detailed and exaction location or placement of assets 18). Site 10 may be a location where assets 18 are stored, or may be another location of interest to system 100. Site 10 may be a physically bounded area, with only a limited number of entry/exit points such as site entrance 12. Alternatively, site 10 may not be physically bounded but only be a defined area of interest for system 100, for example defined by streets or geographic coordinates. In a transit application, for example, site 10 may be a transit bay where assets 18, potentially transit vehicles, go for maintenance and storage when they are not being used.

Gateway 14 communicates via RFID with other gateways 14 and RFID tags 20. To do so, gateway 14 may initiate communication or tag 20 may initiate communication. Gateway 14 may transmit an RFID communication signal (shown as dashed line 24) that 'awakens' RFID tag 20 from a 'sleep' state (an "awaken signal"), for example if the transmission matches requirements of a particular RFID tag 20. RFID tag 20 may then transmit its information (such as sensor information as described herein). Gateway 14 may receive transmissions from one or more asset tags 20 via RFID communications and provide those transmissions to central management system 16 via communication network 26 (such as to perform operations, for example to monitor asset 18). An awaken signal may comprise a header or preamble, followed by the message or information, and may have additional wrappers (for example to facilitate transmission and reception). An awaken signal may simply comprise header/preamble information. For example, the awaken signal may be a simple alternating 1-0-1-0-1-0 sequence being transmitted for a period of time (such as in a preamble) that may be followed by a message (where such message can be identified as a message/chatter of interest).

Gateways 14 and tags 20 may define what they consider an awaken signal and what awaken signal they will act upon (for example by sending their information). For example, they may specify what chatter preambles they will consider chatter, what preambles may be chatter and cause them to act, and what chatter they can ignore, or what packet types may be or are chatter, or may be acted on. Such configurations and lists (of chatter types, preambles, header information and the like) may be stored in MCU 302, for example in lookup tables therein.

Figure 2:
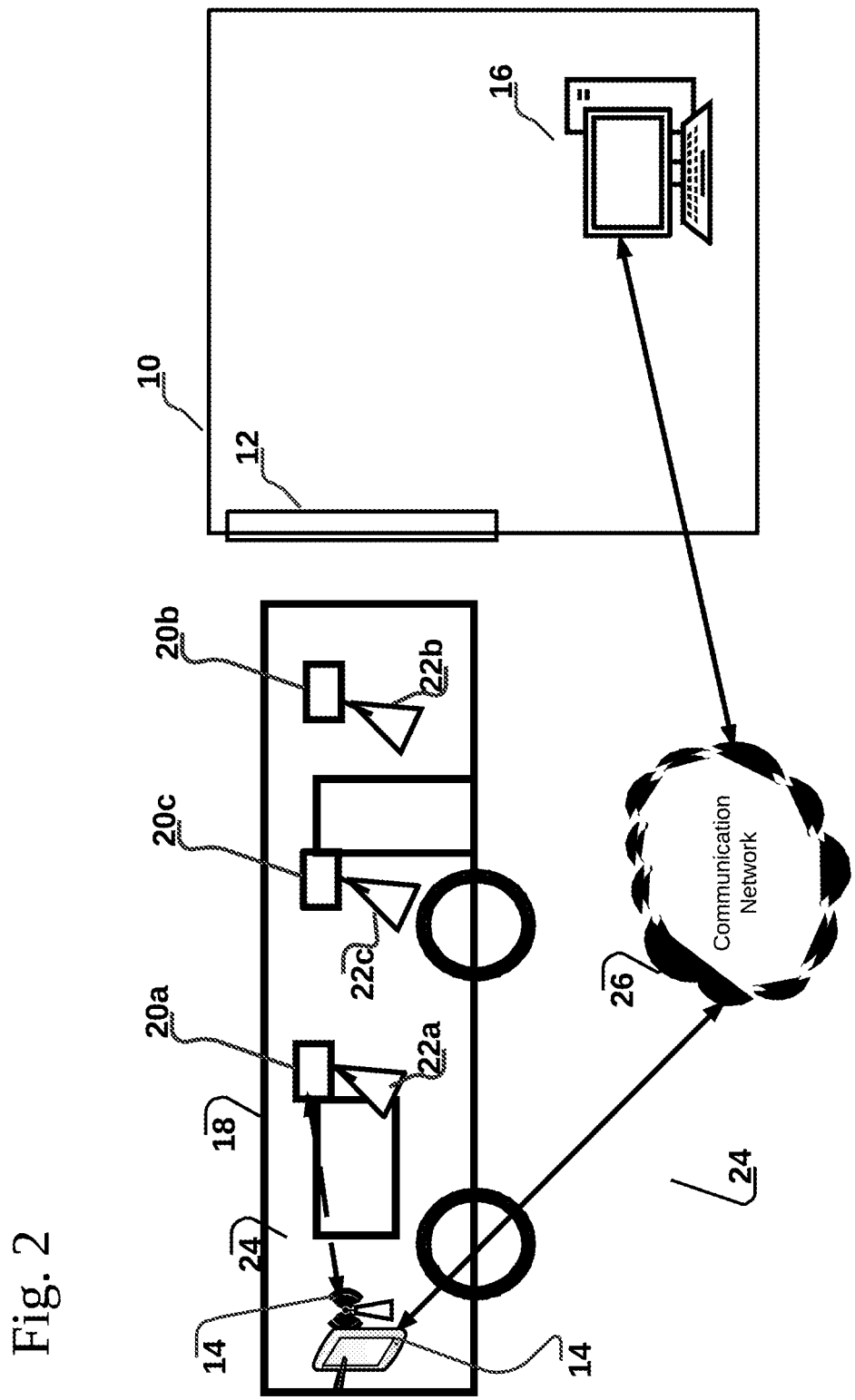
FIG. 2 shows a further high-level architecture of a system for RFID based vehicle monitoring systems according to an embodiment of the invention.

Gateway 14 may communicate with a plurality of asset tags 20 essentially or effectively simultaneously by communicating with a first asset tag 20 for a period of time, then switching to a second asset tag 20, and then a third etc. before returning to the first asset tag 20 to continue communicating with it. This switching may occur fast enough that to a user the asset tags 20 and gateway 14 seem to be in constant communication with each other. Other methods to communicate with a plurality of asset tags 20 known by those skilled in the art may be used. Gateway 14 may be powered, for example, externally, through a direct connection to the municipal electricity grid, or using an onboard power source. Gateway 14 may be removably attachable to substantially any surface and may operate in both external and internal environments. Gateways 14 may be located at substantially any location where assets 18 needs to communicate, including asset 18 itself (as shown in FIG. 2). Though the figure shows gateway 14 located within site 10, gateway 14 may operate in both internal and external environments.

Central management system 16 may be a component of system 100 that provides functionality for users relating to one or more assets 18, such as to operate one or more transit services for a fleet of assets 18. Such functionality may include tracking the location of an asset 18, scheduling assets' use, diagnosing any issues with asset 18 that may require servicing, and scheduling any service work that may be required for asset 18. Central management system 16 may compile information from one or more gateways 14 via communication network 26 with other information, such as servicing work schedules and parts delivery times, for use in providing functionality of system 100 and central management server 16. Central management system 16 may also perform analysis on this information to help in determining the overall performance of a fleet of assets 18, either in real-time or aggregated over configurable periods of time. Central management system 16 may be implemented via one or more pieces of software and may be operated by one or more users. Though it is shown in the figure as one computer, it can be composed of one or more computing and data storage devices and its functionality can be split up across these devices as appropriate. Of course central management system 16 may provide non-transit related functionality, depending on what assets 18 are involved. Central management system 16 is shown as within site 10, but may be located anywhere, including remote from site 10 (though possibly still accessible from within site 10).

Asset 18 may be any object that a user would like to track the location and/or the status of and that may be capable of moving, or being moved, for example between being at site 10, or in a site 10 via a site entrance 12, and not at site 10. Asset 18 may be a vehicle that provides, or relates to the provision of, transit services that may or may not be moving. Asset 18 may comprise other components and systems (not shown) including, but not limited to, electrical, mechanical and computer systems and sensors 22, various of such systems requiring or being capable of monitoring. Exemplary systems and sensors may include window open sensors (such as 22a), door open sensors (such as 22c), and a plurality of other sensors including accelerometers, engine sensors, vibrations sensors, passenger compartment temperature sensors, passenger compartment decibel meters, vehicle systems diagnostic sensors, fluid level sensors, and the like. It is to be understood that sensors 20 have been labelled as 22a, 22b and 22c, and although they share similarities with respect to the present invention that may vary considerably as sensors for such diverse functionality necessarily do.

Asset 18 may have a legacy monitoring system (monitoring one or more characteristics of asset 18 via legacy sensors, such as vehicle manufacturer sensors that were part of the vehicle when it was made), or no monitoring system (requiring after-market installed monitoring systems, which may include after-market installed sensors and after-market installed RFID tags). As used herein, after-market installed sensors are installed after a vehicle is made, often by a party other than the vehicle manufacturer. Although after-market installed sensors may be installed without too much disruption to the asset 18 and effort by an installer, enabling communication of such sensors can be difficult and damaging to the vehicle (the present invention does not require wires to be run through a vehicle's chassis or seating, for example and is less likely to cause wear, or become worn or tampered with), leave communication wires exposed, be cost prohibitive, or a combination of the above.

Asset 18 further comprises one or more RFID tags 20, which may be located thereon or therein, and may be removably attached. The location of asset tag 20 on asset 18 may be used to optimize communication ranges and further reduce power consumption. Asset tag 20 may be able to retrieve and/or determine information relevant to asset 18 (status information), for example its location or information from other components (not shown) of asset 18 for example from one or more sensors, and transmit that information to other assets or gateway 14 when they are within range, allowing asset 18 to communicate with system 100 (for example providing status information to central management system 16) to provide the functionality described herein.

RFID tag 20 may operate in one or more 'states' that may govern high-level operation of RFID tag 20. Such states may include an 'awake' state, where communication is enabled and a 'sleep' state, when communication may not be required. Asset tag 20 may be powered by an onboard power source, such as battery 308, as described herein.

Asset tag 20 may further comprise a plurality of sensors, or be operably connected to sensors, that allow it to gather information regarding asset's 18 status. Each of such sensors may be operably connected to RFID tags 20.

Components that communicate wirelessly in system 100, for example asset tag 20 and gateway 14, have both a transmission range and a reception range. The transmission range denotes the distance which a component can transmit a signal to any other components within system 100, while the reception range of a component denotes the distance within which the component can hear signals. Components of system 100 are said to be in communicable range of each other when the reception range of a first component overlaps with the transmission range of a second, or the transmission range of the first component overlaps with the reception range of the second. When this is not true, the components are said to be out of communicable range of each other. If the reception ranges of both components overlap with the other component's transmission range, the components are said to be in bi-directional communicable range.

Communication network 26 enables communication of information between various components of system 100 including, but not limited to, gateway 14 and central management system 16. Communication network 26 allows for a plurality of signals or information to be sent through its network simultaneously. Communication network 26 may be any public or private network, wired or wireless, and may be substantially comprised of one or more networks that may be able to communicate with each other. Communication network 26 may use a variety of mediums, such as cellular and WiFi networks. Communication networks 26 may not be required, for example, if components of system 100, such as gateway 14 and central management system 16 are able to communicate directly, such as via RFID communications (shown by the dashed lines 24).

In practice, system 100 may be implemented via a series of steps. The following steps may be taken:

1. Determine what sensors are to be communication-enabled.
2. Interface each sensor with asset tag 20. This may involve software configuration or modifications to asset tag 20 and/or sensor 22. It may also involve gaining access to the sensors.
3. Specify frequency and nature of information to be communicated from each sensor.
4. Determine how the sensors' information is to get to central management system 16. Will each sensor communicate directly with a gateway, or will some sensors aggregate information before communicating with gateway 14? Where will gateway 14 be placed—on the asset 18 or at a site 10? Physical layouts and the frequency and nature of information to be communicated will partially govern implementation details.

FIG. 2 shows system 200, which may be substantially similar to system 100. In system 200 however, gateway 14 has been placed on asset 18, and one or more tags 20 communicate via RFID with gateway 14. It is worth noting that in both systems 100 and 200 asset tags 20 may communicate with each other such that only a few tags 20 communicate with gateway 14 (in a mesh network type of arrangement). Gateway 14 may then communicate with central management system 16, via communication network 26. In such an arrangement existing hardware on the vehicle, such as mobile data terminal or on board unit (OBU) 28.

OBU 28 may be any on board system that may be used by drivers to perform their functions. Exemplary OBUs 28 may include the Ranger™ product by Trapeze™.

Alternatively site 10 may have another gateway 14 such that multiple gateways 14 communicate directly, obviating the need to rely on communication network 26.

Figure 3:
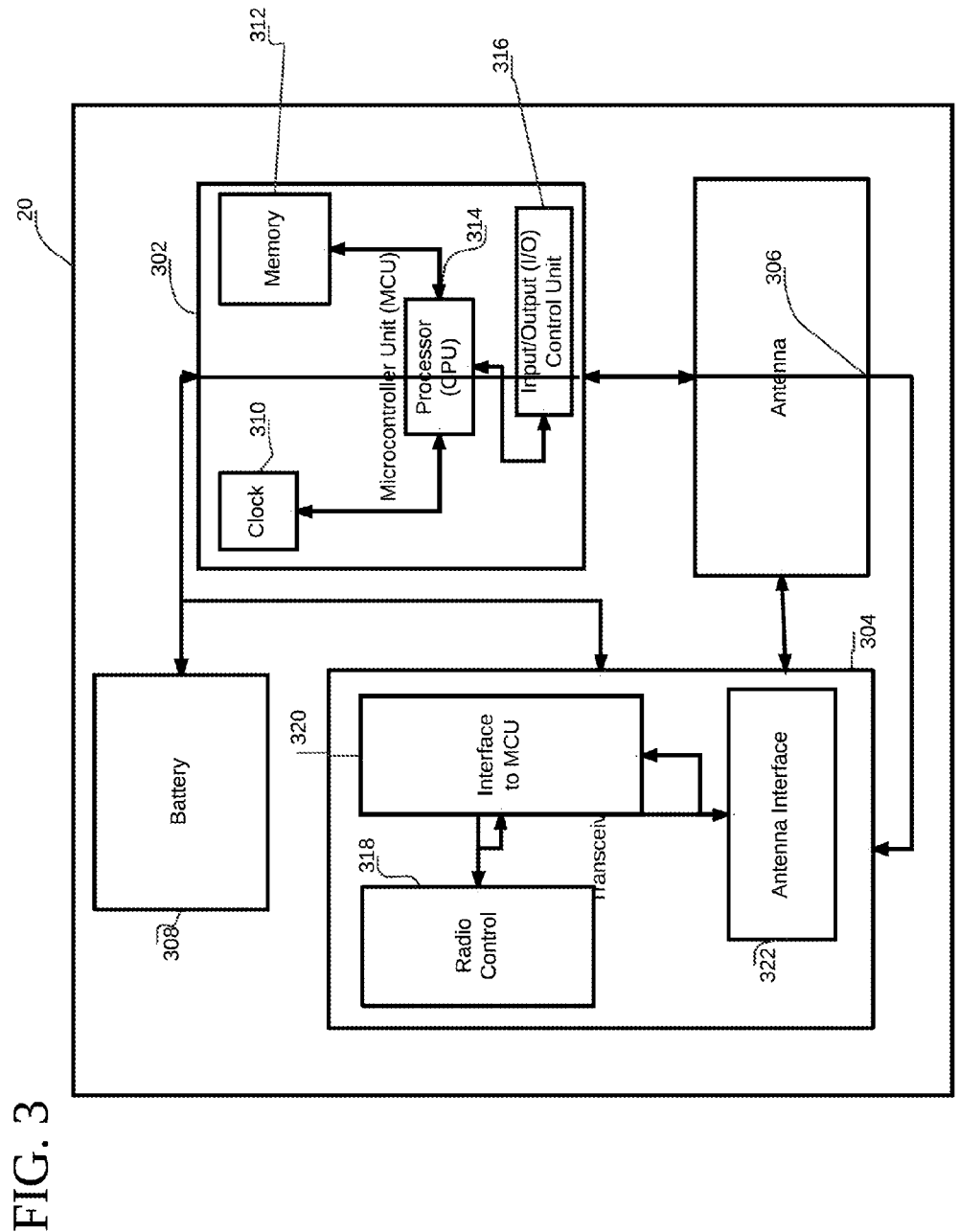
FIG. 3 shows a schematic of a tag according to an embodiment of the invention.

FIG. 3 shows a schematic of asset tag 20 according to an embodiment of the invention. Asset tag 20 may be comprised of microcontroller unit (MCU) 302, transceiver 304 and antenna 306, any or all of which may be operably connected, for example to allow any required communication therebetween. Asset tag 20 further comprises battery 308, which may be operably connected to the other components in asset tag 18 to act as a power source for these other components.

MCU 302 may control operation of asset tag 20, determining when asset tag 20 should perform specific operations, such as communication, and directing the operations of transceiver 304 and, via transceiver 304, antenna 306. MCU 302 may be able to adjust the operations of asset tag 20 based on the information it receives from other components, including transceiver 304 and I/O control unit 316. MCU 18 may have a configurable cycle (that may be timed by clock 310) where it 'powers on' briefly to determine whether it, and/or other components of asset tag 20, require power to perform operations. For example, MCU 302, at the end of a clock cycle, may query transceiver 304 if there is a transmission from gateway 14.

MCU 302 may communicate directly with transceiver 304, sending it operation instructions and responding to the information it receives from it. For example, once 'powered on', MCU 302 may provide or direct power to transceiver 304 and then query it to determine if it is receiving chatter signals, then provide more power as required to enable transceiver 304 to perform required communication operations.

MCU 302 may also communicate with systems outside of asset tag 20, for example other computer systems on asset 18 such as sensors 22 (such as via I/O control unit 316), and use that information to determine what operations asset tag 18 should perform.

MCU 302 further comprises clock 310, memory 312, central processing unit (CPU) 314 and input/output ("I/O") control unit 316, and may comprise or house transceiver 304, antenna 306 and/or battery 14 depending on hardware implementation details.

Transceiver 304 allows asset tag 20 to communicate with system 100. Transceiver 304 may communicate substantially any of the information asset tag 20 has, collects or calculates, including, for example the location of asset tag 20 and sensor information from sensors 22a/b/c. Transceiver 304 may generate and receive signals wirelessly via RFID communication (as shown in dashed lines 24). Transceiver 304 may be able to convert signals that it receives wirelessly into a medium used to transmit information to MCU 302. Transceiver 304 may also receive information from MCU 302 that may control what signals transceiver 304 transmits, when it will transmit signals, and when it will listen for signals to receive. Alternatively or in addition, transceiver 304 may be able to initiate these actions on its own.

Transceiver 304 may be a low power transceiver, such as the CC1101 produced by Texas Instruments, and may be able to enter different states to minimize power usage. For example, when not in operation, transceiver 304 may enter into sleep mode, and when listening for gateway, transceiver 304 may limit the power used to provide only enough to detect if there is a transmission, and provide more power as required if a transmission is detected.

Transceiver 304 further comprises radio control 318, MCU interface 320, clock 322 and antenna interface 322, and may comprise antenna 306 depending on hardware implementation details.

Though transceiver 304 may be able to transmit and receive signals itself, it may be operably connected to antenna 306, which may perform one or both of these functions instead. Transceiver 304 may direct power from battery 308 to antenna 306, or may send a signal to antenna 306 that will allow it to 'power up' and perform operations. Antenna 306 may also be able to minimize power consumption by entering a 'sleep state'. Antenna 306 may be external to transceiver 304, and may be external to asset tag 20.

Battery 308 may store power for use by some or all of the components located on asset tag 20. It may power these components directly, or may be routed through MCU 302 to the other components, with MCU 302 directing when transceiver 304 and antenna 306 receive power. It may be a light, small battery whose usage may be minimized to last for long periods of times. It may be charged by an external source. Exemplary batteries 308 may include rechargeable lithium batteries (such as lithium/ion or lithium/metal), nickel, metal hydride, super-capacitors, and the like.

Clock 310 may track time and provide a stable clock signal which may be used by CPU 314, and/ or other components of MCU 302, to perform operations. The clock also may be directly connected to other components within asset tag 20. This clock may be based on a crystal oscillator, or use another technology as would be known to those of skill in the art. Clock 310 may have one or more configurable timers, one of which may be a trigger for asset tag 20 to wake up when it expires. Clocks similar to clock 310 may also exist independently in other components, for example in transceiver 304 and antenna 306. Other timers may exist during operation as well, causing tag 20 (and/ or components thereof) to perform certain activities on expiry. Such other timers may have different times or frequencies depending on, for example, whether asset tag 20 is on site or not, in motion or not, which state MCU 18 or tag 104 is in, or other factors.

Memory 312 may allow information to be stored in asset tag 20. It may store or collect information from within MCU 302, or be sent information from other sources (such as sensor information from sensors 22) and store that information for later use by asset tag 20. This information can comprise programmed instructions as well as information collected by other components, such as transceiver 304 and sensors 22, and that may be used by other components, such as CPU 314. Memory 312 may also store information relating to the identifier that asset tag 20 expects to receive from gateway 14. Memory 312 may comprise volatile memory such as random access memory, non-volatile memory such as varieties of read only memory, or a combination of both.

CPU 314 may control at least some of the operations of asset tag 20 by performing logical calculations using information it receives from the other components and instructions that may be stored in memory 312. CPU 314 may also determine what operations should be performed by asset tag 20 based on parameters sent to it by other components. It may determine what information should be stored in memory 312, and if information should be sent to components outside of MCU 302 using I/O control unit 316 and/ or transceiver 304. CPU 314 may also determine what operations other components, inside and outside of MCU 302, should be performing, and if they should be 'powered off' to conserve power.

I/O control unit 316 may send information to components outside of MCU 302, and receive information from outside components (such as sensor information from sensors 22) to be processed by MCU 302. These outside components may be internal or external to asset tag 18. If the outside components are external to asset tag 20, the information may be sent wirelessly to the outside components from I/O control unit 316 via transceiver 304 and antenna 306. I/O control unit 316 is in direct communication with CPU 314, which informs it as to what information to send, and receives information that I/O control unit 316 collects. CPU 314 can use this information as an input into its logical calculations.

Radio control 318 may control what mode transceiver 304 is in. These modes may comprise the following:

Transmit mode (an example of an awake mode): In this mode transceiver 304 may be transmitting messages wirelessly, potentially through antenna 306 via antenna interface 322;

Receive mode (an example of an awake mode): In this mode transceiver 304 may receive information, such as through antenna 306 via antenna interface 322, and convey those messages to MCU 302 via MCU interface 320; and Sleep mode: In this mode transceiver 304 has powered down most of its components and is only using power as necessary to ensure that it can 'awaken' out of sleep mode when necessary.

Radio control 318 may be controlled by signals received from MCU interface 320, through a direct connection to MCU 302, or it may a have processor among its components that can perform logical operations based on data it receives in a manner similar to CPU 314.

MCU interface 320 may send signals to and receives signals from MCU 302. It may also send and receive information from other components of asset tag 20 or asset 18. MCU interface 320 may interpret the information it receives from these other components and pass it along to components within transceiver 304 as necessary. For example, information to be transmitted via antenna 306 may be sent directly to antenna interface 322, while information that controls the mode of transceiver 304 may be sent directly to radio control 318.

Antenna interface 322 may allow transceiver 304 to be operably connected to an external antenna, such as antenna 306. Antenna interface 322 relays information it receives from MCU interface 320 to antenna 306 for transmission, and sends any information it receives from antenna 306 to MCU interface 320. Antenna interface 322 may be set to be either transmitting or receiving signals based on the mode set by radio control 318. Antenna interface 322 may also be configured to power antenna 306.

This concludes the description of the presently preferred embodiments of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A system for radio frequency identification (RFID) tag-based vehicle monitoring comprising:
   a vehicle comprising a plurality of sensors, each sensor operably connected to one of a plurality of after-market installed RFID tags, the plurality of after-market installed RFID tags configured to receive sensor information about the vehicle from the plurality of sensors and to transmit, via RFID communications, the sensor information to a gateway; and
   a gateway configured to receive, via RFID communications, sensor information.

2. The system of claim 1 wherein the plurality of sensors comprise at least a first vehicle manufacturer sensor and a first after-market sensor.

3. The system of claim 1 wherein the gateway is located on the vehicle.

4. The system of claim 3 further comprising:
   a mobile data terminal, operably connected to the gateway and configured to receive the sensor information from the gateway, and further configured to communicate sensor information to a central management system; and
   a central management system configured to receive sensor information from the gateway and process the sensor information.

5. The system of claim 1 wherein the gateway is located at a site.

6. The system of claim 5 wherein the gateway is located at a entrance to a site.

7. The system of claim 6 wherein the plurality of aftermarket installed RFID tags are configured to:
- determine if the vehicle is in motion and if it is then:
  - listen for the gateway and upon hearing the gateway;
  - communicate, via RFID communications, the sensor information to the gateway.

8. The system of claim 6 wherein the plurality of aftermarket installed RFID tags comprise a first RFID tag and one or more further RFID tags; and
- the first RFID tag is configured to:
  - determine if the vehicle is in motion and if it is then:
    - listen for the gateway and upon hearing the gateway;
    - awaken the further RFID tags;
    - communicate, via RFID communications, its sensor information to the gateway; and
- the further RFID tags are configured to:
  - be awoken by the first RFID tag; and
  - communicate, via RFID communications, their sensor information to the gateway.

* * * * *